(12) United States Patent
Baker et al.

(10) Patent No.: US 7,813,305 B2
(45) Date of Patent: Oct. 12, 2010

(54) SETTING UP A CONFERENCE CALL WITH A HASHED ADDRESS

(75) Inventors: Albert J Baker, Eatontown, NJ (US); Eileen P Rose, Manasquan, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1097 days.

(21) Appl. No.: 11/382,319

(22) Filed: May 9, 2006

(65) Prior Publication Data
US 2007/0274283 A1    Nov. 29, 2007

(51) Int. Cl.
    *H04L 12/16* (2006.01)
(52) U.S. Cl. .................. 370/261; 709/227
(58) Field of Classification Search .......... 370/260, 370/261, 262; 709/227
    See application file for complete search history.

(56) References Cited

U.S. PATENT DOCUMENTS

| | | | |
|---|---|---|---|
| 6,493,324 B1 | 12/2002 | Truetken | |
| 6,742,042 B1 | 5/2004 | Holden et al. | |
| 6,917,612 B2 | 7/2005 | Foti et al. | |
| 6,937,597 B1 | 8/2005 | Rosenberg et al. | |
| 6,982,973 B2 | 1/2006 | Truetken | |
| 7,002,912 B2 | 2/2006 | Wengrovitz | |
| 7,151,753 B2 | 12/2006 | Chaney et al. | |
| 7,170,863 B1 | 1/2007 | Denman et al. | |
| 7,184,415 B2 | 2/2007 | Chaney et al. | |
| 7,266,594 B2 | 9/2007 | Kumbalimutt et al. | |
| 7,269,655 B2 | 9/2007 | Kim | |
| 7,283,506 B2 | 10/2007 | Mayer et al. | |
| 7,302,053 B2 | 11/2007 | Chang et al. | |
| 7,340,046 B2 | 3/2008 | McClung et al. | |
| 7,398,294 B2 | 7/2008 | Florkey et al. | |
| 7,418,509 B2 | 8/2008 | Koskelainen et al. | |
| 7,466,812 B1 | 12/2008 | Mahy et al. | |
| 7,546,133 B2 | 6/2009 | Harris et al. | |
| 7,617,280 B1 | 11/2009 | Webster et al. | |
| 7,630,328 B2 | 12/2009 | Wright et al. | |
| 2002/0120760 A1* | 8/2002 | Kimchi et al. | 709/230 |
| 2003/0046433 A1* | 3/2003 | Luzzatti et al. | 709/248 |

(Continued)

OTHER PUBLICATIONS

Liu, Ben H, "U.S. Appl. No. 11/382,321 Office Action Jan. 25, 2010",, Publisher: USPTO, Published in: US.

(Continued)

*Primary Examiner*—Andrew Lee
(74) *Attorney, Agent, or Firm*—DeMont & Breyer, LLC

(57) ABSTRACT

A method and apparatus to arrange for and to set up a conference call are disclosed. The party who arranges for a conference call provides all of the details of the conference call to a conferencing server through an encoded public address. The arranging party's telecommunications endpoint then transmits the encoded, initial public address to the server. The encoded public address is encoded with (i) the public address for each participant, which can be a group address or an individual address, and (ii) one or more commands that can be used to control the conference call, and is encoded in such a way so that it is still routable to the conferencing server. Because the encoded public address comprises all of the participants, either the conferencing server or an external proxy server can recursively retrieve all of the constituent public and contact addresses to set up the call.

25 Claims, 5 Drawing Sheets

U.S. PATENT DOCUMENTS

| | | |
|---|---|---|
| 2004/0030750 A1 | 2/2004 | Moore et al. |
| 2004/0125756 A1 | 7/2004 | Lepore et al. |
| 2004/0133641 A1 | 7/2004 | McKinnon et al. |
| 2005/0201320 A1 | 9/2005 | Kiss et al. |
| 2005/0223104 A1* | 10/2005 | Pessi .......................... 709/230 |
| 2005/0262260 A1* | 11/2005 | Kim et al. ................... 709/231 |
| 2006/0013233 A1 | 1/2006 | Trossen et al. |
| 2006/0018292 A1 | 1/2006 | Wiatrowski et al. |
| 2006/0039367 A1 | 2/2006 | Wright et al. |
| 2006/0088152 A1 | 4/2006 | Green et al. |
| 2006/0146792 A1* | 7/2006 | Ramachandran et al. .... 370/352 |
| 2006/0155814 A1 | 7/2006 | Bennett et al. |
| 2006/0239255 A1* | 10/2006 | Ramachandran et al. .... 370/352 |
| 2007/0097886 A1 | 5/2007 | Schwagmann et al. |
| 2007/0159989 A1 | 7/2007 | Wu et al. |
| 2007/0239899 A1* | 10/2007 | Gonen et al. ................ 709/249 |
| 2007/0263831 A1* | 11/2007 | Miao .......................... 379/219 |
| 2007/0291734 A1* | 12/2007 | Bhatia et al. ................ 370/352 |
| 2008/0069315 A1* | 3/2008 | Tanigawa et al. ......... 379/88.17 |
| 2008/0298278 A1 | 12/2008 | Thakkar et al. |
| 2009/0295905 A1* | 12/2009 | Civanlar et al. .......... 348/14.09 |

OTHER PUBLICATIONS

Liu, Ben H., "U.S. Appl. No. 11/382,321 Office Action May 26, 2010",, Publisher: USPTO, Published in: US.

* cited by examiner

SETTING UP A CONFERENCE CALL WITH A HASHED ADDRESS

CROSS-REFERENCE TO RELATED APPLICATIONS

This application incorporates herein by reference the underlying concepts, but not necessarily the nomenclature, of U.S. patent application Ser. No. 11/382,321, filed May 9, 2006

FIELD OF THE INVENTION

The present invention relates to telecommunications in general, and, more particularly, to the arranging and setting up of a conference call.

BACKGROUND OF THE INVENTION

A telephone conference call is a means by which multiple participants communicate by calling into a conference "bridge," which is a system that enables all of the call's participants to hear each other. In the prior art, a conference call is arranged for by obtaining, from the conferencing service that provides the bridge, a telephone number and pass code with which to access the bridge. The bridge telephone number and pass code are distributed ahead of time to all of the participants of the call. At the time that the conference call is scheduled to begin, each participant dials into the bridge by using the telephone number and pass code.

The problem with having conference call participants dialing into the bridge is that it takes time for everyone to join the conference, as it is up to each participant to realize that the conference is starting, to find the telephone number and pass code, and to call in. Alternatively, if the conferencing service were to out-dial to the participants, instead of the participants manually dialing in, then the service would have to communicate with one or more of the telecommunications endpoints (e.g., an Internet-protocol telephone, a notebook computer, a personal digital assistant [PDA], a tablet computer, etc.) that belong to each participant. This would be made possible by using the Session Initiation Protocol, or "SIP."

SIP is a set of standardized communication rules for initiating and maintaining communications for telephony, presence-based systems, instant messaging, and other telecommunications applications. The protocol provides a way to communicate with a group of endpoint devices that are based on a public address. A SIP-based, out-dialing system could derive a set of registered endpoint addresses for each participant from each public address and use those endpoint addresses when attempting to invite each user to a conference call.

The limitation with using SIP for conferencing, however, is that it does not inherently simplify the administration of conference calls prior to the actual call event, in terms of arranging for the call and setting up the resources for the call. For example, adding public addresses to the list of participants can be awkward. In addition, having the conferencing system out-dial to the participants, instead of the other way around, often has to be manually provisioned one participant at a time.

What is needed is a way to improve the arranging for and setting up of a conference call, without some of the disadvantages in the prior art.

SUMMARY OF THE INVENTION

The present invention is a technique to arrange for and to set up a conference call, without some of the disadvantages in the prior art. In particular, the party who arranges for a conference call, through a Session Initial Protocol-enabled (SIP-enabled) endpoint, provides all of the details of the conference call to a conferencing server through an encoded public address, in accordance with the illustrative embodiment of the present invention. The arranging party's telecommunications endpoint then transmits the encoded, initial public address to the conferencing server. The encoded public address is encoded with (i) the public address for each participant, which can be a group address or an individual address, and (ii) possibly one or more commands that can be used to control the conference call, and is encoded in such a way so that it is still routable through a network to the conferencing server. Because the encoded public address comprises all of the participants, either the conferencing server or an external proxy server—or both working in tandem—can recursively retrieve all of the constituent public addresses of the participants and, in turn, all of the contact addresses for each individual to set up the call. For example, instead of being provisioned with five addresses to be included in a conference, the conferencing server of the illustrative embodiment only has to receive the encoded public address that comprises the public addresses of the participants and some commands.

The public address that is initially presented to the conferencing server is encoded, in accordance with the illustrative embodiment, by using a two-way, hashing algorithm. Such hashing algorithms include DES, Blowfish, RC4, and so forth. The hashing algorithm is two-way, in order to enable the conferencing server to then unhash the encoded address into two or more public addresses and, possibly, one or more commands. When it is time to set up the conference call, the conferencing server provides at least some of the unhashed public addresses to one or more SIP-enabled proxy servers, which then further resolve the public addresses into contact addresses. The significance here is that the physical addressing of the conference participants has been abstracted out of the conferencing server and into the external proxy servers, which are already well-suited to handle the physical addressing. The conferencing setup process of the illustrative embodiment recursively parallel forks the setup request until all public addresses and all registered endpoints for those public addresses have been tried and brought into the conference call.

The technique of the illustrative embodiment is advantageous over some techniques in the prior art for various reasons. First, as some of the functionality that has been traditionally performed by the conferencing server is off-loaded to the proxy server, group address administration need only be performed once at the proxy server, instead of twice as in the prior art: once at the proxy server for other communications features and once at the conferencing system. Second, any conference scheduling application that features the encoding of the illustrative embodiment can, via a single communications path, (i) provide the addressing and command information and (ii) conference the specified participants together. Specifically, this means that rather than inviting, referring, or transferring the individual participants into a conference, as in the prior art, a single encoded address is specified by an endpoint, received by the conferencing server, and resolved into constituent public and contact addresses, followed by the setup request being parallel forked to those contact addresses of the registered endpoints of the participants. This saves time and effort during the actual setting up of a conference call session.

The illustrative embodiment of the present invention comprises receiving a hashed initial address that is associated with a first telecommunications session; resolving the hashed initial address into a second address and a third address; and routing an invitation to a contact address to join the first telecommunications session, wherein the contact address is one of: (i) the second address, and (ii) an address that is resolved from the second address.

DETAILED DESCRIPTION

The following terms are defined for use in this Specification, including the appended claims:

The term "call," and its inflected forms, is defined as a communication of user information between two or more telecommunications terminals. Examples of a call are a voice telephone call (including interactive voice response [IVR] sessions), an emailing, a text-based instant message [IM] session, a video conference, and so forth. In a Session Initiation Protocol (or "SIP") context, a call is a type of "session."

The term "address resolution," and its inflected forms, is defined as the process of separating an address into constituent addresses. For example, a hashed public address, once unhashed, is resolvable into multiple public addresses. If the resolved public addresses are group addresses, then each group address is further resolvable into multiple public addresses of individuals. Each resolved public address of an individual is, in turn, further resolvable into the contact addresses of one or more telecommunications endpoints. A first address that is directly resolvable into a second address is resolvable in one step; a first address that is indirectly resolvable into a third address is resolvable in two or more steps. Addresses are resolved into constituent addresses in the manner that is described later in this Specification.

Figure 1:
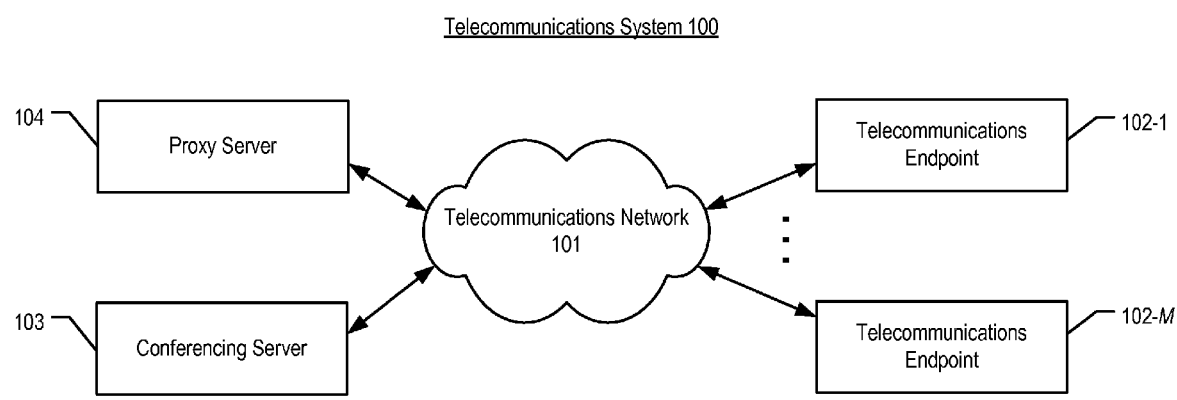
FIG. 1 depicts telecommunications system 100 in accordance with the illustrative embodiment of the present invention.

FIG. 1 depicts telecommunications system 100 in accordance with the illustrative embodiment of the present invention. Telecommunications system 100 comprises telecommunications network 101; telecommunications endpoints 102-1 through 102-M, wherein M is a positive integer; conferencing server 103; and proxy server 104, interconnected as shown. Telecommunications system 100 is capable of Session Initiation Protocol-based (SIP-based) signaling, in accordance with the illustrative embodiment. Nevertheless, it will be clear to those who are skilled in the art, after reading this specification, how to apply the present invention to some alternative embodiments that use other types of call-control signaling, such as H.323 as is known in the art.

Telecommunications network 101 is a telecommunications network such as the Internet, the Public Switched Telephone Network (PSTN), and so forth. Network 101 comprises or is connected to one or more transmission-related nodes such as gateways, routers, or switches that are used to direct data packets from one or more sources to the correct destinations of those packets. Network 101 is capable of handling SIP-based messages in well-known fashion that are transmitted among two or more SIP-capable processing systems.

Telecommunications endpoint 102-$m$, for m=1 through M, is a SIP-capable device such as an Internet-protocol telephone, a notebook computer, a personal digital assistant (PDA), a tablet computer, and so forth. Each endpoint is capable of originating outgoing calls and receiving incoming calls, in well-known fashion. In addition, each endpoint is capable of one or more communication modes that comprise, but are not limited to voice, video, data, email, instant messaging, and chat.

Each telecommunications endpoint 102-$m$ is identified by a unique contact address, as is known in the art. Moreover, each contact address is associated with a public address of a particular user. For example, a user named Bob Smith might have a public address of "bobsmith" and one endpoint, endpoint 102-1, which is identified by the contact address sip:19735554567@company.com. Similarly, a user named Carol Q. Jones might have a public address of "cjones" and four endpoints, endpoints 102-2 through 102-5, which are identified by the following contact addresses:

i. sip:cjones@111.111.111.111:5061; transport=tls;
    ii. sip:cqj@111.111.111.222:5061; transport=tls;
    iii. sip:19735551212@company.com; and
    iv. sip:carol@home.com.

A user named Alice Z. Martin might have a public address of "azmartin" and one endpoint, endpoint 102-6, which is identified by its own unique contact address as well. As those who are skilled in the art will appreciate, public addresses can be specified in various formats, as long as they are recognizable throughout network 101.

In the example, each telecommunications endpoint is considered to be a contact for the purpose of reaching its user (i.e., Bob, Carol, or Alice). When an endpoint is added to system 100, such as when the endpoint is plugged into a wall socket, the added endpoint registers its contact address with a registrar server. As a result, system 100 is able to resolve the called party's public address—specified by the calling party and received as part of an incoming call—into its constituent contact addresses and is then able to route the call to one or more registered telecommunications endpoints in well-known fashion.

Some or all of telecommunications endpoints 102-1 through 102-M are also capable of encoding information in the form of a hashed public address, in accordance with the illustrative embodiment of the present invention. The details of the encoding are described below and with respect to FIG. 3.

It will be clear to those skilled in the art, after reading this specification, how to make and use telecommunications endpoints 102-1 through 102-M.

Conferencing server 103 is a server that operates in accordance with the Session Initiation Protocol and that is described in additional detail below and with respect to FIG. 2. Server 103 enables dial-in and dial-out conferencing that involves two or more of endpoints 102-1 through 102-M, in well-known fashion. Server 103 comprises a bridging function that mixes media, for each participant, from other sources on a conference call. Server 103 also comprises conference applications, in well-known fashion.

In accordance with the illustrative embodiment, conferencing server 103 receives, unhashes, and resolves one or more addresses (e.g., hashed, public, etc.) that the server is presented with. The details of this process are described below and with respect to FIGS. 3 through 5. Moreover, the physical addressing (i.e., contact addressing) of the conference participants is administered external to conferencing server 103, at one or more servers such as proxy server 104. As those who are skilled in the art will appreciate, the physical addressing functionality that has been performed by a conferencing server in the prior art is either disabled or not present in conferencing server 103, in accordance with the illustrative embodiment of the present invention. It will be clear to those who are skilled in the art, after reading this specification, how to make and use conferencing server 103.

Proxy server 104 is a server that operates in accordance with the Session Initiation Protocol. Server 104 is capable of handling incoming calls (i.e., invitations to join a session) on behalf of each of the users in telecommunications system 100 to whom public addresses are assigned. Based on the address that is receives, proxy server 104 routes the notification of an incoming call to one or more contacts, in well-known fashion. Although one proxy server (i.e., server 104) is depicted as part of system 100, system 100 comprises multiple proxy servers in some alternative embodiments. It will be clear to those skilled in the art how to make and use proxy server 104.

Figure 2:
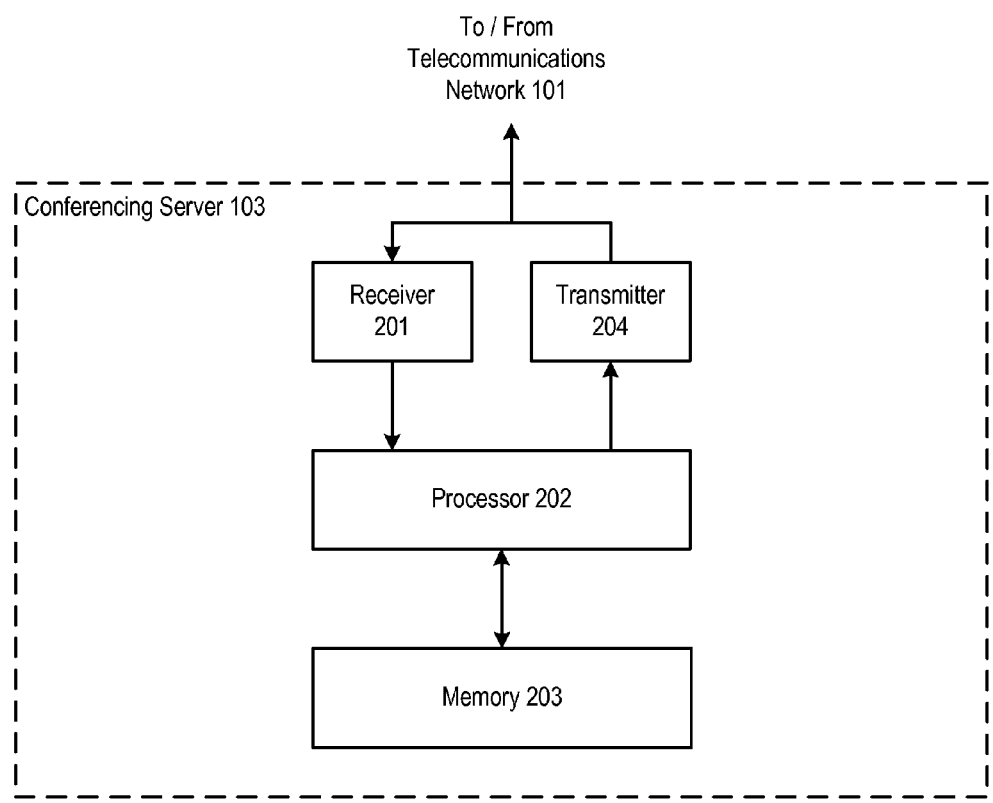
FIG. 2 depicts the salient components of conferencing server 103, which is part of system 100.

FIG. 2 depicts the salient components of conferencing server 103 in accordance with the illustrative embodiment of the present invention. Server 103 comprises receiver 201, processor 202, memory 203, and transmitter 204, interconnected as shown.

Receiver 201 receives signals from other nodes (e.g., telecommunications endpoint 102-*m*, proxy server 104, etc.) via network 101 and forwards the information encoded in the signals to processor 202, in well-known fashion. It will be clear to those skilled in the art, after reading this specification, how to make and use receiver 201.

Processor 202 is a general-purpose processor that is capable of receiving information from receiver 201, executing instructions stored in memory 203, reading data from and writing data into memory 203, executing the tasks described below and with respect to FIGS. 3 and 4, and transmitting information to transmitter 204. In some alternative embodiments of the present invention, processor 202 might be a special-purpose processor. In either case, it will be clear to those skilled in the art, after reading this specification, how to make and use processor 202.

Memory 203 stores the instructions and data used by processor 202. Memory 203 might be any combination of dynamic random-access memory (RAM), flash memory, disk drive memory, and so forth. It will be clear to those skilled in the art, after reading this specification, how to make and use memory 203.

Transmitter 204 receives information from processor 202 and transmits signals that encode this information to other nodes (e.g., telecommunications endpoint 102-*m*, proxy server 104, etc.) via network 101, in well-known fashion. It will be clear to those skilled in the art, after reading this specification, how to make and use transmitter 204.

Figure 3:
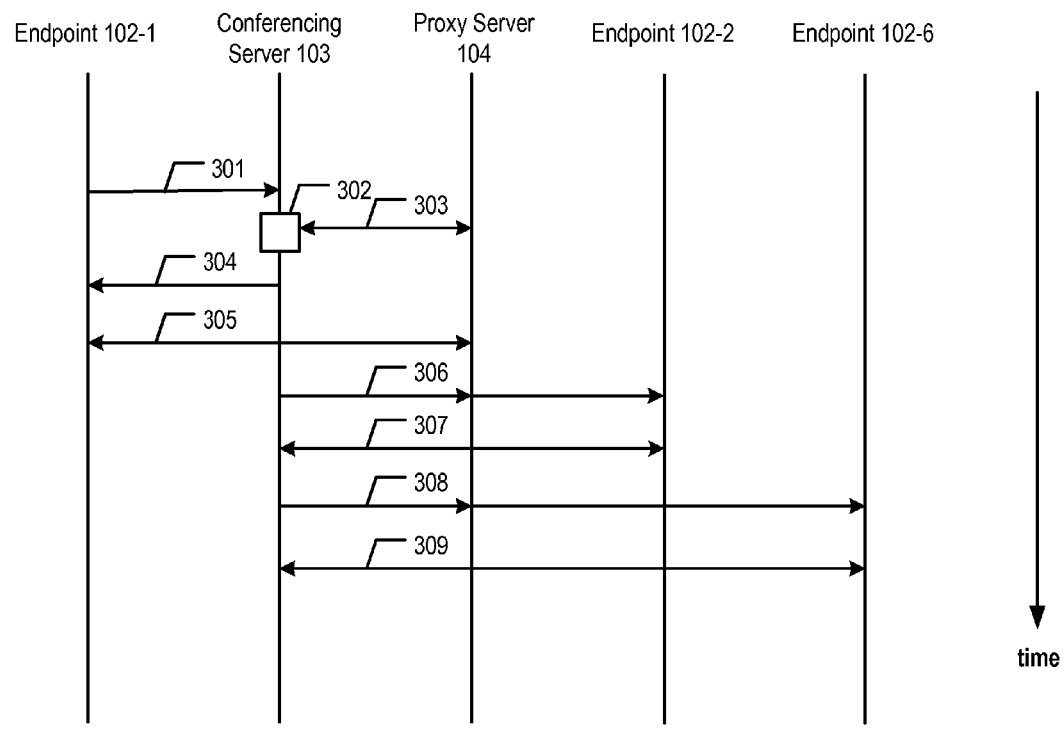
FIG. 3 depicts a message flow diagram of the salient events handled within telecommunications system 100 in arranging and setting up a conference call, in accordance with the illustrative embodiment of the present invention.

FIG. 3 depicts a message flow diagram of the salient events handled within telecommunications system 100 in arranging and setting up a conference call, in accordance with the illustrative embodiment of the present invention. In the depicted example, Bob, Carol, and Alice (referred to in an earlier example) are to be participants of the conference call, with Bob arranging the call. As those who are skilled in the art will appreciate, some of the events that appear in FIG. 3 can occur in parallel or in a different order than that depicted. Furthermore, some of the events that appear in FIG. 4 can involve other nodes (e.g., additional proxy servers, etc.), in some alternative embodiments, as those who are skilled in the will appreciate.

Bob, who is the user of endpoint 102-1, wishes to hold a conference call with Carol and Alice, who are the users of endpoints 102-2 and 102-6, respectively. Bob initially arranges the conference call by selecting the participants (e.g., from a "buddy list," etc.) and pressing the conference button on his endpoint. In accordance with the illustrative embodiment, endpoint 102-1 creates a hashed initial address that is representative of the conference information that Bob specified. The initial address, which is a public address, comprises the addressing information all of the participants, as well as possibly one or more commands. The addressing information of the participants can be, for example, the public address for each participant (e.g., "bobsmith," "cjones," etc.). The commands, for example, might direct the conferencing server to set up a conference call at 10:00 AM on Thursday by out-dialing to the public addresses of Bob, Carol, and Alice, where Bob is to serve as moderator and, as such, is to be conferenced in before the others. The hashed address might be in the form of (i) a uniform resource identifier, such as "company.com/conference_server/oi4trg89ohg5t4df89g," (ii) a username at an Internet Protocol address, such as "3853thg0dfkjhv4cn74rubm@company.com," or (iii) in another format. The address is formatted in such a way that to telecommunications system 100, the hashed address looks like a public address that is routable through network 101 to conferencing server 103.

The hashed, public address is the result of a symmetric cipher, which conferencing server 103 (with support from proxy server 104) can unhash and resolve into public addresses and commands. Illustrative symmetric ciphers that can perform a two-way hash are DES, Blowfish, or RC4, as are well-known in the art. After it generates the hashed address, endpoint 102-1 transmits, via message 301, the hashed address to conferencing server 103.

At event 302, conferencing server 103 processes the received hashed address by unhashing and resolving the address, in accordance with the illustrative embodiment. The tasks that comprise event 302 are described below and with respect to FIG. 4. In processing the received hashed address, server 103 utilizes one or more proxy servers (e.g., proxy server 104, etc.) to handle the physical addressing of the endpoints. Conferencing server 103 exchanges information with proxy server 104, as depicted by message exchange 303.

Having resolved Bob's public address into one or more contact addresses, conferencing server 103 transmits to Bob's endpoint 102-1, via message 304, an invitation (e.g., an INVITE message, etc.) to join the session (i.e., the conference call). Via message exchange 305, endpoint 102-1 and conferencing server 103 complete the join process and start exchanging traffic. As those who are skilled in the art will appreciate, one or more proxy (and other) servers might be involved in the set up of the session. In the example, Bob's endpoint is joined to the session first because Bob specified to the conferencing service to do so, as part of event 301.

Having resolved Carol's public address into one or more contact addresses, conferencing server 103 transmits to Carol's endpoint 102-2, via message 306, an invitation (e.g., an INVITE message, etc.) to join the session (i.e., the conference call). Via message exchange 307, endpoint 102-2 and conferencing server 103 complete the join process and start exchanging traffic. As those who are skilled in the art will appreciate, one or more proxy (and other) servers might be involved in the set up of the session.

Having resolved Alice's public address into one or more contact addresses, conferencing server 103 transmits to Alice's endpoint 102-6, via message 308, an invitation (e.g., an INVITE message, etc.) to join the session (i.e., the conference call). Via message exchange 309, endpoint 102-6 and conferencing server 103 complete the join process and start exchanging traffic. As those who are skilled in the art will appreciate, one or more proxy (or other) servers might be involved in the set up of the session.

Figure 4:
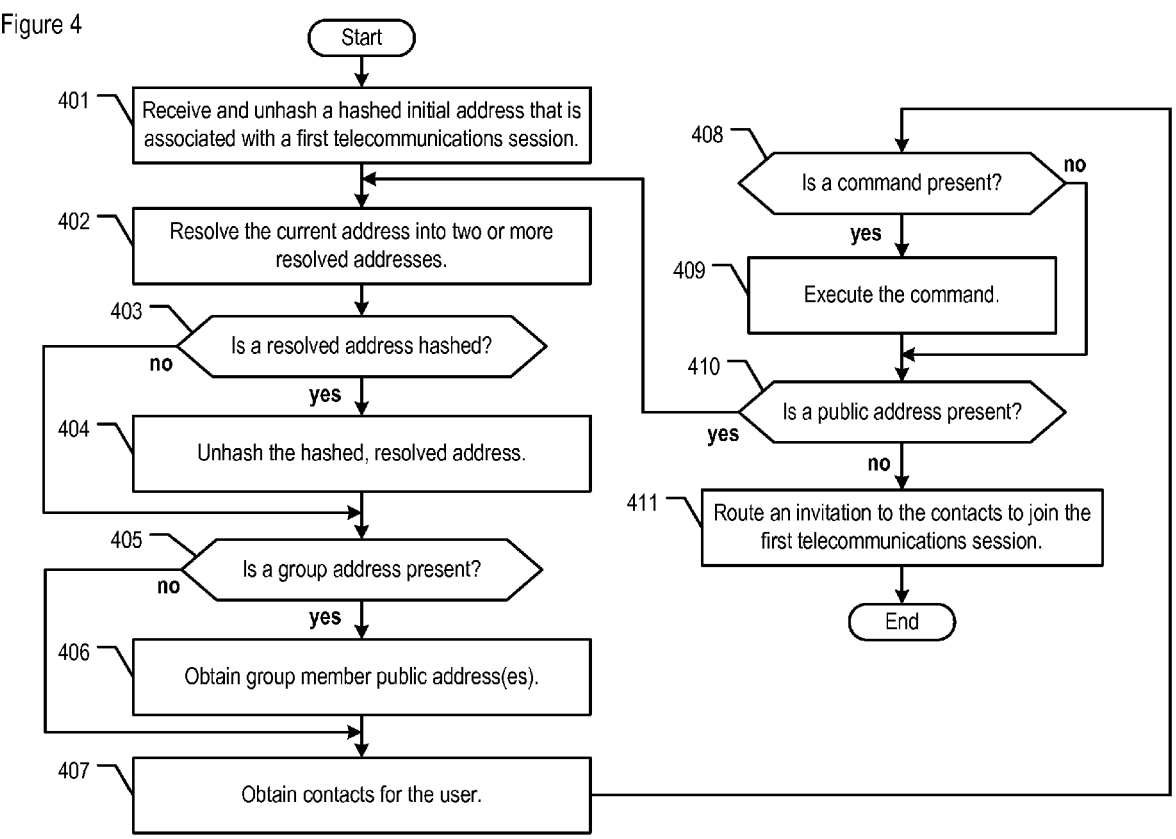
FIG. 4 depicts a flowchart of the salient tasks performed by conferencing server 103 in receiving a hashed address, in accordance with the illustrative embodiment of the present invention.

FIG. 4 depicts a flowchart of the salient tasks performed by conferencing server 103 in receiving a hashed address, in accordance with the illustrative embodiment of the present invention. As those who are skilled in the art will appreciate, some of the tasks that appear in FIG. 4 can be performed in parallel or in a different order than that depicted. In some alternative embodiments, some of the tasks that appear in FIG. 4 can be performed by one or more proxy servers, such as proxy server 104, as those who are skilled in the will appreciate.

At task 401, server 103 receives and unhashes an initial hashed address that is associated with a first telecommunications session, such as a future conference call. To unhash the address, server 103 utilizes the cipher that is used by the telecommunications endpoint (or other source) to hash the address initially. The initial address is unhashed to reveal one or more addresses, as well as possibly one or more commands.

At task 402, server 103 resolves, into two or more addresses, the address that is currently being processed. As those who are skilled in the art will appreciate, address resolution can involve one or more steps, such as domain name system service resource records (DNS SRV) lookup, E.164 number and DNS-based service (ENUM) lookup, and location server lookup; address resolution might also involve one or more proxy servers that act on behalf of conferencing server 103.

At task 403, server 103 determines if a resolved address is itself hashed. If the resolved address is hashed, task execution proceeds to task 404. If not, task execution proceeds to task 405.

At task 404, server 103 unhashes the resolved address. To unhash the address, server 103 utilizes whatever two-way cipher was used to hash the address initially. The address is unhashed to reveal one or more addresses, as well as possibly one or more commands.

At task 405, server 103 determines if a group address, as is known in the art, is present among the resolved addresses. A group address is the public address of multiple users that belong to a group; for example, research@company.com might be the group address for all of the researchers in the Company Corporation. If a group address is present, task execution proceeds to task 406. If not, task execution proceeds to task 407.

At task 406, server 103 obtains the public addresses of the group members. As those who are skilled in the art will appreciate, this can involve one or more steps, such as DNS SRV lookup, ENUM lookup, and location server lookup; obtaining the individual public addresses might also involve one or more proxy servers that act on behalf of conferencing server 103.

At task 407, server 103 obtains the contact address or addresses that are associated with the public address that is currently being processed. As those who are skilled in the art will appreciate, this can involve one or more steps, such as DNS SRV lookup, ENUM lookup, and location server lookup; obtaining the contact addresses might also involve one or more proxy servers that act on behalf of conferencing server 103.

At task 408, server 103 checks if a command has been unhashed from a hashed address. If a command has been unhashed, task execution proceeds to task 409. If not, task execution proceeds to task 410.

At task 409, server 103 executes the one or more commands that have been unhashed. A first command, for example, might be to set up a specified endpoint (e.g., endpoint 102-1, etc.) as part of a conference call before any of the other participating endpoints (e.g., 102-2 and 102-6, etc.). A second command, for example, might be to bill the conference call to a specified individual or organization (e.g., Bob Smith, the Research organization, etc.).

At task 410, server 103 determines if any more public addresses have yet to be resolved. If there are additional public addresses, task execution proceeds to task 402. If not, task execution proceeds to task 411.

At task 411, server 103 routes invitations to join the first telecommunications session to the contacts that have been resolved from one or more public addresses. The routing step might have been explicitly specified as one or more of the commands that were unhashed at task 401 (or task 404), or the routing step might be implicit as part of conferencing server 103's inherent functionality. In some alternative embodiments, the routing of each invitation occurs as soon as that invitation's corresponding contact address is determined. After task 411, task execution ends.

Figure 5:
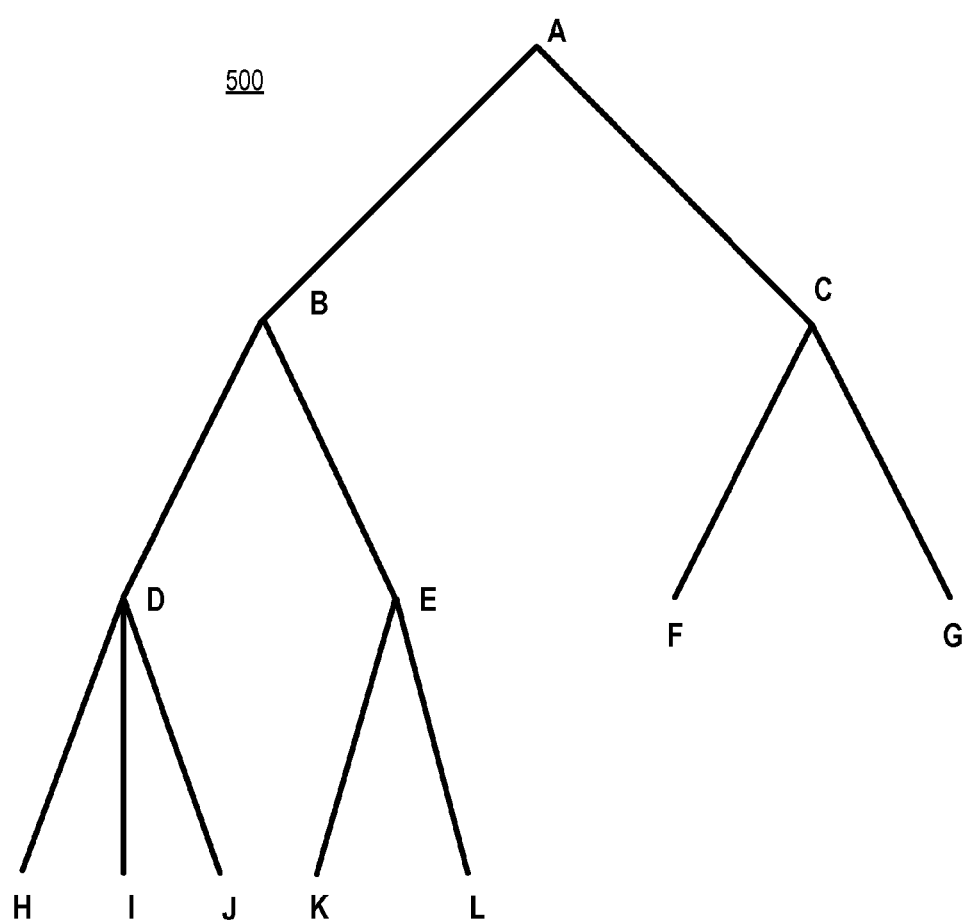
FIG. 5 depicts a tree that illustrates the recursive nature of tasks 401 through 410, which are depicted in FIG. 4.

FIG. 5 depicts a tree that illustrates the recursive nature of tasks 401 through 410. Addresses A through L are shown in the tree, where the single, alphabetic characters are used as shorthand notation for the actual address values. Address A is received by conferencing server 103 and is unhashed to reveal addresses B and C. Address B is a group address and is further resolved into addresses D and E. Address D, an individual's public address, is further resolved into contact addresses H, I, and J. Address E, also an individual's public address, is further resolved into contact addresses K and L. Address C, yet another individual's public address (instead of a group address), is further resolved into contact addresses F and G. Some or all of the contact addresses (i.e., addresses H, I, J, K, L, F, and G) are then used in task 411 to set up a telecommunications session, by parallel forking the setup request to the telecommunications endpoints that correspond to the contact addresses of the participants.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
   receiving, by a server, a hashed initial address that is associated with a first telecommunications session;
   resolving, by the server, the hashed initial address into a second address and a third address; and
   routing an invitation, from the server to a contact address, to join the first telecommunications session, wherein the contact address is one of:
   (i) the second address, and
   (ii) an address that is resolved from the second address.

2. The method of claim 1 wherein the second address is resolvable into a fourth address.

3. The method of claim 2 wherein the second address is hashed.

4. The method of claim 2 wherein the second address is the public address of a first end user and the third address is the public address of a second end user.

5. The method of claim 1 wherein the contact address identifies a telecommunications endpoint that operates in accordance with the Session Initiation Protocol.

6. The method of claim 1 wherein the hashed initial address is also resolvable into at least one command.

7. The method of claim 6 wherein the at least one command comprises conferencing in, to the first telecommunications session, a first end user before a second end user.

8. The method of claim 6 wherein the at least one command comprises billing for the first telecommunications session.

9. The method of claim 1 wherein the hashed initial address is received at a conferencing server from a telecommunications endpoint, wherein the conferencing server and the telecommunications endpoint operate in accordance with the Session Initiation Protocol.

10. The method of claim 9 further comprising:
    when the second address is a public address, transmitting the second address to a proxy server that is physically distinct from the conferencing server, and
    receiving the contact address from the proxy server;
    wherein the proxy server operates in accordance with the Session Initiation Protocol.

11. A method comprising:
    receiving, by a server, a hashed initial address that is associated with a first telecommunications session;
    resolving, by the server, the hashed initial address into a second address, a third address, and at least one command that is applicable to the first telecommunications session; and
    executing, by the server, the at least one command.

12. The method of claim 11 wherein the at least one command comprises routing an invitation to a contact address to join the first telecommunications session, wherein the contact address is one of:
    (i) the second address, and
    (ii) an address that is resolved from the second address.

13. The method of claim 12 wherein the at least one command further comprises conferencing in, to the first telecommunications session, a first end user before a second end user.

14. The method of claim 11 wherein the at least one command comprises billing for the first telecommunications session.

15. The method of claim 11 wherein the second address is resolvable into a fourth address.

16. The method of claim 15 wherein the second address is hashed.

17. A method comprising:
    receiving, by a server, an initial address that is directly resolvable into at least two public addresses;
    resolving, by the server, multiple addresses that belong to a first series of addresses, wherein each address in the first series, excepting the first address in the first series, is resolved from a preceding address in the first series, and wherein the first address in the first series is resolved from the initial address; and
    when a contact address has been resolved from any address in the first series, adding by the server a first telecommunications endpoint to a first telecommunications session, wherein the first telecommunications endpoint is identified by the contact address.

18. The method of claim 17 further comprising resolving multiple addresses that belong to a second series of addresses, wherein each address in the second series, excepting the first address in the second series, is resolved from a preceding address in the second series, and wherein the first address in the second series is resolved from the initial address.

19. The method of claim 18 further comprising adding, to the first telecommunications session, a second telecommunications endpoint that is identified by an address in the second series.

20. The method of claim 17 wherein at least one address in the first series is directly resolvable into at least two addresses.

21. The method of claim 20 wherein the at least two addresses are public addresses.

22. The method of claim 21 wherein the at least two addresses are for different end users.

23. The method of claim 20 wherein the at least two addresses are contact addresses of telecommunications endpoints that operate in accordance with the Session Initiation Protocol.

24. The method of claim 17 wherein the initial address is hashed.

25. The method of claim 24 wherein the initial address is also resolvable into at least one command.

* * * * *